J. J. DE LANCEY.

BALANCED SLIDE VALVE.

No. 10,142. Reissued June 27, 1882.

WITNESSES:

Donn Twitchell.

C. Sedgwick

INVENTOR:

J. J. DeLancey

BY Munn & Co

ATTORNEYS.

N. PETERS, Photo-Lithographer, Washington, D. C.

UNITED STATES PATENT OFFICE.

JOHN J. DE LANCEY, OF BINGHAMTON, NEW YORK.

BALANCED SLIDE-VALVE.

SPECIFICATION forming part of Reissued Letters Patent No. 10,142, dated June 27, 1882.

Original No. 179,002, dated June 20, 1876. Application for reissue filed May 2, 1882.

*To all whom it may concern:*

Be it known that I, JOHN J. DE LANCEY, of Binghamton, in the county of Broome and State of New York, have invented a new and useful Improvement in Balanced Slide-Valves, of which the following is a full, clear, and exact description.

My invention relates to that class of anti-friction valves in which the upper surface of the valve works in steam-tight contact with a face-plate in the steam-chest, the object of the invention being the construction of a balanced valve that shall operate with but little friction and not be liable to derangement.

My invention consists in a new construction or arrangement of the parts, as hereinafter described and claimed.

Reference is to be had to the accompanying drawings, forming part of this specification, in which similar letters of reference indicate corresponding parts in all the figures.

Figure 1:
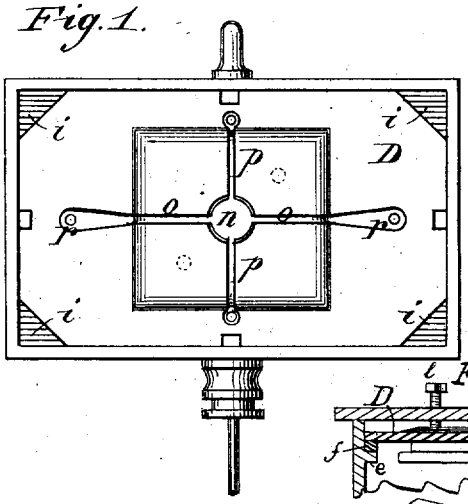
Figure 2:
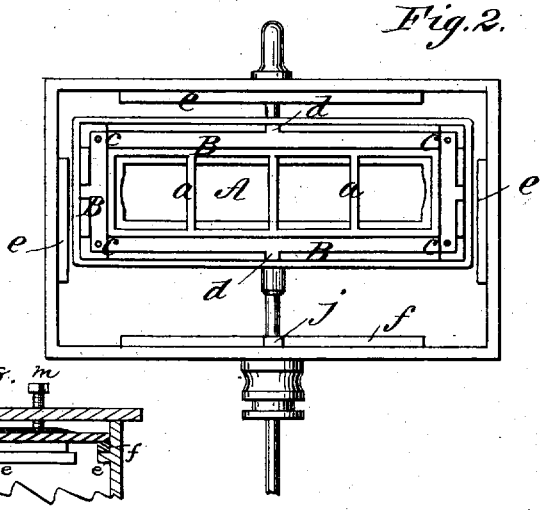
Figure 8:
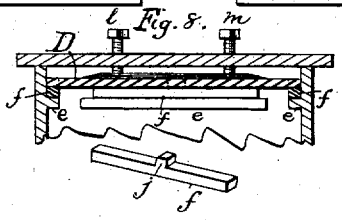
Figure 6:
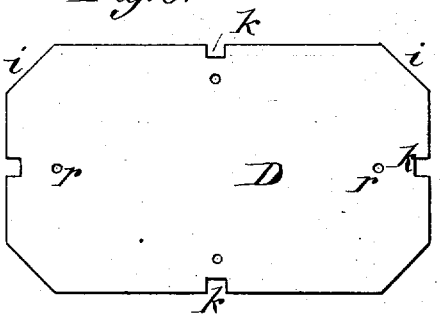
Figure 3:
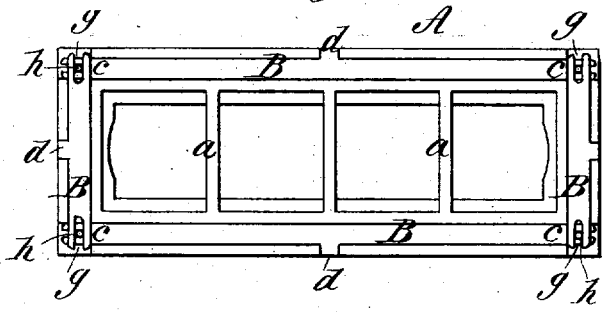
Figure 5:
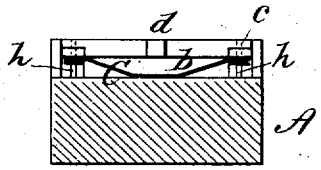
Figure 4:
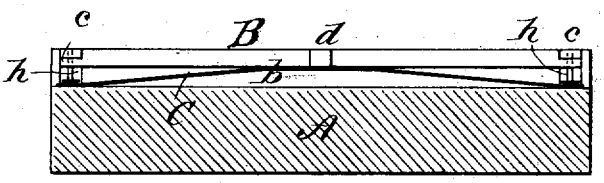
Figure 7:
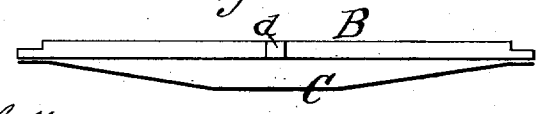

Figure 1 is a plan view of a steam-chest with the cover removed, and showing the face-plate of the valve. Fig. 2 is a plan view with the face-plate removed, and showing the valve and connections in position. Fig. 3 is a plan view of the valve removed from the chest, and with the packing-bars in place. Fig. 4 is a sectional side elevation of the valve. Fig. 5 is a sectional end view of the valve, showing the manner of connecting the packing-bars. Fig. 6 is an inverted view of the face-plate. Fig. 7 shows one of the packing-bars removed. Fig. 8 is a detail sectional view, showing the balance-plate held in place by set-screw, also a perspective view of one of the adjusting-bars.

A is a skeleton-valve, consisting of transverse ribs *a*, and plane sides and adjustable plate or top. This top obviates pressure on the valve with the exception of that required to maintain a steam-tight contact with the valve-seat when the port is covered and the cylinder full of steam. The sides and ends of the valve have plain perpendicular surfaces instead of the usual projecting flanges, by which means a larger exhaust-cavity may be used, and the downward pressure upon the usual flange is avoided.

The upper edges of the valve A have longitudinal and transverse grooves *b* for the packing-bars B, which are made square in cross-section. This square form of the packing-bars allows of a broader bearing on the face-plate than the ordinary rectangular or flattened bar, which is liable by its unequal sides and unequal pressure to catch against the sides of grooves *b*, so that its free movement is prevented, while the bar having equal sides presents the same surface for the steam to act upon on each of its sides. These bars are connected by square lap-joints *c* on each corner, the longer bars supporting the shorter ones, which arrangement secures an equal bearing against the face-plate until the packings are worn out.

From the outside and center of each bar there is a projecting lug, *d*, which works in a slot made in the outside of the groove *b*. These lugs carry the bar separate and independent of the joint *c*, which prevents the bar from changing its relative position with the face-plate, thereby obviating the usual wear at the points of contact.

C C are elliptical or plate springs, which work in the grooves *b* under the packing-bars B, and may have their bearings on the ends of the bars, as shown in Figs. 5 and 6, or on a flattened surface in the center, as shown in Fig. 4. The ends of these springs have slots *g*, which work astride safety-pins *h* in the corners of the valve. These pins enter holes in the ends of long bars B, to prevent the escape of any part of the spring if it should break. The two long springs are all that is required to keep the packing up, and the two short ones are simply for safety in case the long ones break.

D is the face-plate, which is fitted closely in the steam-chest, with the exception of triangular openings *i* at each corner for free circulation of steam in the chest. This face-plate has its bearings on four lugs, *e*, projecting from the inside of the steam-chest, and they take the full pressure of the face-plate, by which means the valve is relieved of pressure and the usual attachment to the chest-cover is obviated and a more satisfactory adjustment secured. Between these lugs and the face-plate are four bars, *f*, which have projections *j* from the top and center, entering notches *k* in the face-plate, which holds them securely in position.

When the valve wears or is faced down the face-plate is adjusted to its position upon the valve by reducing the thickness of the bars *f*, and when the face-plate has been faced over screws *l m* in the cover are turned down to the required distance, which holds it in position. These screws also secure the plate in place when the throttle is first opened.

For oiling the valve a recess, *n*, is made in the face-plate directly under the oil-cup, from which recess oil passes through channels *o p* to oil-holes *r* in each of the four sides of the face-plate. It is then distributed over the long packing-bars, when the valve is at its extreme travel, and over the short bars without intermission.

It is to be observed that the face or balance plate D is supported independently of the ordinary screws in the steam-chest, which arrangement allows of a more accurate and ready adjustment of the face-plate than can be accomplished when suspended in the usual manner.

Having thus fully described my invention, what I claim as new, and desire to secure by Letters Patent, is—

1. The slide-valve A, formed with plane or flat sides combined together in a steam-chest, with the face or balance plate D, fitting closely in the steam-chest, the lugs *e*, and bars *f*, the latter having projections *j*, which enter notches *k* in the balance-plate D, substantially as shown and described.

2. The square packing-bars B, connected at their ends by lap-joints *c*, and provided with lugs *d*, working in slots, substantially as described.

3. The face or balance plate D, fitting closely in the steam-chest, with openings *i* in the corners, lugs *e* for supporting the plate in position, the adjusting-bars *f*, and set-screws *l m*, combined together and with the steam-chest, substantially as shown and described.

4. The valve A, formed with plane or flat sides, in combination with the square packing-bars B, connected at their ends by lap-joints, the lugs *d*, working in slots, substantially as described, and the face or balance plate D, substantially as shown and described.

JOHN J. DE LANCEY.

Witnesses:
P. P. ROGERS,
T. P. CALKIN.